US006893202B2

(12) United States Patent
Hunt

(10) Patent No.: US 6,893,202 B2
(45) Date of Patent: May 17, 2005

(54) DUAL PURPOSE GRAIN CART

(75) Inventor: Jeff Hunt, St. Brieux (CA)

(73) Assignee: Bourgault Industries Ltd., Saskatchewan (CA)

( * ) Notice: Subject to any disclaimer, the term of this patent is extended or adjusted under 35 U.S.C. 154(b) by 42 days.

(21) Appl. No.: 10/100,539

(22) Filed: Mar. 18, 2002

(65) Prior Publication Data
US 2003/0175103 A1 Sep. 18, 2003

(51) Int. Cl.$^7$ ................................................. B60P 1/40
(52) U.S. Cl. ..................... 414/519; 414/523; 414/526
(58) Field of Search ................... 414/514, 523, 414/526

(56) References Cited

U.S. PATENT DOCUMENTS

| | | | | |
|---|---|---|---|---|
| 2,827,204 A | | 3/1958 | McCurdy | 222/176 |
| 3,391,812 A | | 7/1968 | Heider | 214/552 |
| 3,521,930 A | | 7/1970 | Tucker | 298/24 |
| 3,561,681 A | * | 2/1971 | Tyler | 239/663 |
| 3,874,530 A | * | 4/1975 | Purdy | 414/526 |
| 3,891,109 A | * | 6/1975 | Olson | 414/502 |
| 4,071,226 A | * | 1/1978 | Miller | 366/64 |
| 4,095,705 A | * | 6/1978 | Hood | 414/519 |
| 4,646,942 A | | 3/1987 | Kuhns | 222/144.5 |
| 4,923,358 A | | 5/1990 | Van Mill | 414/519 |
| 5,108,249 A | * | 4/1992 | Kinzenbaw et al. | 414/523 |
| 5,340,265 A | | 8/1994 | Grieshop | 414/526 |
| 5,516,253 A | * | 5/1996 | Linscheid et al. | 414/519 |
| 5,615,990 A | | 4/1997 | Grieshop | 414/526 |
| 5,876,176 A | * | 3/1999 | Smith et al. | 414/523 |
| 5,888,044 A | * | 3/1999 | Baskerville | 414/523 |
| 6,017,182 A | * | 1/2000 | Grieshop | 414/526 |
| 6,095,616 A | | 8/2000 | Grieshop | 298/27 |

FOREIGN PATENT DOCUMENTS

CA 2257048 12/1998

* cited by examiner

Primary Examiner—Kathy Matecki
Assistant Examiner—Sang Kim
(74) Attorney, Agent, or Firm—Frost Brown Todd LLC

(57) ABSTRACT

A two-wheeled hoppered cart is particularly adapted to receive crop from a combine and transfer same to another transport vehicle with an unloading conveyor, and to conveniently transport products to an air-seeder cart. The frame comprises a rear frame portion supporting the hoppered container, and a front frame portion extending forward and down from the rear frame portion to a hitch. A port with a gate is located below the rear frame, and a pair of wheels is mounted on the frame such that the rotational axis is located below the rear frame portion and rearward of the port. An access area below the port, ahead of the port, and to the first side of the port, is unobstructed. An intake hopper of a conventional air-seeder cart filling conveyor can be positioned under the port with the filling conveyor in front of the wheel on the first side of the cart.

13 Claims, 5 Drawing Sheets

DUAL PURPOSE GRAIN CART

This invention is in the field of towed transport vehicles and in particular such vehicles for receiving, carrying, and unloading granular material such as grain and fertilizer.

BACKGROUND OF THE INVENTION

Hoppered grain wagons or carts are well known for use in transporting granular material. The granular material is unloaded by gravity through a port in the bottom of the hopper, or by means of a conveyor mounted in the hopper and oriented to transfer the granular material to an exterior of the hopper.

Gravity dump wagons have conventionally been four-wheeled wagons. These four-wheeled wagons have predominantly used side discharge hoppers, where the bottom sump of the hopper is located on one side of the wagon such that the granular material flows out a port on the side approximately in line with the wheels. Such a configuration allows the operator to drive alongside a transfer conveyor and align the port with the transfer conveyor. Typically the transfer conveyor has a small intake hopper attached to the intake end thereof to collect and direct the granular material. The sump and port on the wagon are located high enough to clear such intake hoppers. Such side discharge four-wheeled wagons are disclosed in U.S. Pat. No. 2,827,204 to McCurdy and U.S. Pat. No. 6,095,616 to Grieshop.

In order to have the sump (the lowest part) of the hopper located on one side of the hopper, the sloping floor must extend from one side to the opposite side of the hopper. With a center discharge hopper, the sloping floors extend only about half way that distance, ie. from each side, and the ends, to the center. Center discharge hoppers thus have a greater capacity for the same height. Side discharge hoppers also carry more weight on the discharge side, and thus are not as stable as center discharge hoppers.

A four-wheeled wagon with a center discharge hopper is disclosed in U.S. Pat. No. 3,521,930 to Tucker. Four-wheeled wagons with mounted conveyors for discharge are also known, as for example in U.S. Pat. No. 5,615,990 to Grieshop and U.S. Pat. No. 4,646,942 to Kuhns where granular material from a side discharge hopper is directed into an auger conveyor. U.S. Pat. No. 3,391,812 to Heider discloses a side discharge four-wheeled wagon that allows for gravity discharge into the intake hopper of a transfer conveyor, or discharge through an auger conveyor.

The addition of a conveyor allows for unloading the granular material directly into another transport vehicle without the need for a transfer conveyor.

More recently two-wheeled carts with a conveyor discharge from a centrally located sump have become popular. These are typically large capacity carts carrying 500 bushels or more. The center sump provides maximum capacity for a given wall height, and improved stability over side discharge hoppers. Having only two wheels instead of four greatly simplifies the apparatus as well, since no steering mechanism is required. A steering mechanism strong enough to stand the stresses exerted by the weight of such a large capacity apparatus would be very costly and subject to wear and malfunction.

Examples of these two-wheeled carts are disclosed in U.S. Pat. No. 4,923,358 to Van Mill and U.S. Pat. No. 5,340,265 to Grieshop. Such two-wheeled carts were designed for towing in the field by a tractor to pick up grain from a combine harvester, commonly simply called a combine, and then transferring the grain directly into a truck for road transport to a storage location without the need for a transfer conveyor. There has thus been no provision made for gravity unloading the granular material into a transfer conveyor. A port is generally provided in the sump for cleaning granular material from the hopper, and the port may also be used for gravity dumping into a drive-over pit. The port is not, however, accessible from the side for moving the intake hopper of a transfer conveyor into position for receiving granular material from the port because the frame obstructs the area surrounding the port. On air-seeder carts, the conventional filling conveyor is oriented at a steep angle in order to reduce the length of conveyor required. This steep angle makes it even more difficult to move the intake hopper of such a filling conveyor into a position under the port to receive the contents of the container.

Conventional two-wheeled carts are thus limited in their utility. The unloading conveyor does not have sufficient reach to allow discharge directly into the top of an air-seeder cart. It is however not possible to unload into the intake hopper of a conventional filling conveyor on an air-seeder cart, except through the unloading conveyor. The height of the unloading conveyor discharge is such that, to avoid spillage during the fall into the intake hopper, a tube or the like must be positioned to receive the granular material from the conveyor discharge and direct same into the intake hopper. Such a process is impractical for repeated use, such as filling an air-seeder cart.

During planting two or more transport vehicles are often required to carry seed and fertilizer to the field. Different fertilizers, such as nitrogen, phosphate, potassium, sulfur, etc. may be required. Granular chemicals now are sometimes transported as bulk products rather than bagged. Air-seeder carts now often have three or more compartments to allow varying amounts of three or more products to be applied. Separate transport for each product is thus required, stretching the transport resources of the farmer.

To address this well recognized problem, and allow a wider range of vehicles to be used to carry required agricultural materials to an air-seeder, the filling conveyor of the air-seeder cart may be modified to reach under the port. Such a modification is disclosed in the laid open Canadian patent application number 2,257,048 of Lisafeld. That disclosed modification requires the addition of a universal joint and extended hopper to the standard filling conveyor. It would be an advantage to economically provide a more versatile transport vehicle that could instead be used with any conventional filling conveyor such as is presently found on the vast majority of air-seeder carts.

SUMMARY OF THE INVENTION

It is an object of the present invention to provide a two-wheeled cart for transporting granular material that is configured for gravity discharge of granular material from a center discharge hopper through a sump port into the intake hopper of a conventional filling conveyor on an air seeder as well as for discharge via a conveyor into a separate transport vehicle.

It is a further object of the present invention to provide such a two-wheeled cart configured such that an access area below the port, ahead of the port, and to one side of the port, is unobstructed, thereby allowing an intake hopper of the conventional filling conveyor on an air seeder cart to be positioned under the port with the filling conveyor in front of the wheel.

The present invention provides a dual purpose two-wheeled cart adapted for attachment to a rear end of a tow vehicle for movement along the ground, the cart adapted to receive granular crop production from a combine and transfer same to another transport vehicle, and adapted to transport granular agricultural products to an air-seeder cart. The cart comprises a hoppered container having a floor sloping downward and inward from walls of the container to a central sump. A frame comprises a rear frame portion supporting the hoppered container, and a front frame portion extending forward from the rear frame portion and having a front end forward of and below the rear frame portion. A hitch is attached on the front end of the front frame portion adapted for attachment to the rear end of a tow vehicle. A port is located below the rear frame portion and oriented substantially upright and generally facing a first side of the cart to allow granular agricultural products to flow out of the sump towards the first side of the cart. A gate is operable to open and close the port. A pair of wheels is rotatably mounted on the frame on a common rotational axis, such that the rotational axis is located below the rear frame portion and rearward of the port. An access area below the port, ahead of the port, and to the first side of the port, is unobstructed, such that an intake hopper of a conventional air-seeder cart filling conveyor can be positioned under the port with the filling conveyor in front of the wheel on the first side of the cart. An unloading conveyor is operable to move agricultural products from the sump to a conveyor discharge located on an exterior of the container at a suitable location for discharging into a transport vehicle.

The present inventor has recognized that by reconfiguring the conventional two-wheeled cart, the utility of the cart can be greatly increased. Proper positioning of the port, wheels, and frame provides an open access area which allows an intake hopper to be positioned under the port. Instead of being useful primarily at harvest time for picking up grain from a combine and carrying same to a transport vehicle, the cart of the invention is equally useful for hauling agricultural products to an air-seeder cart.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
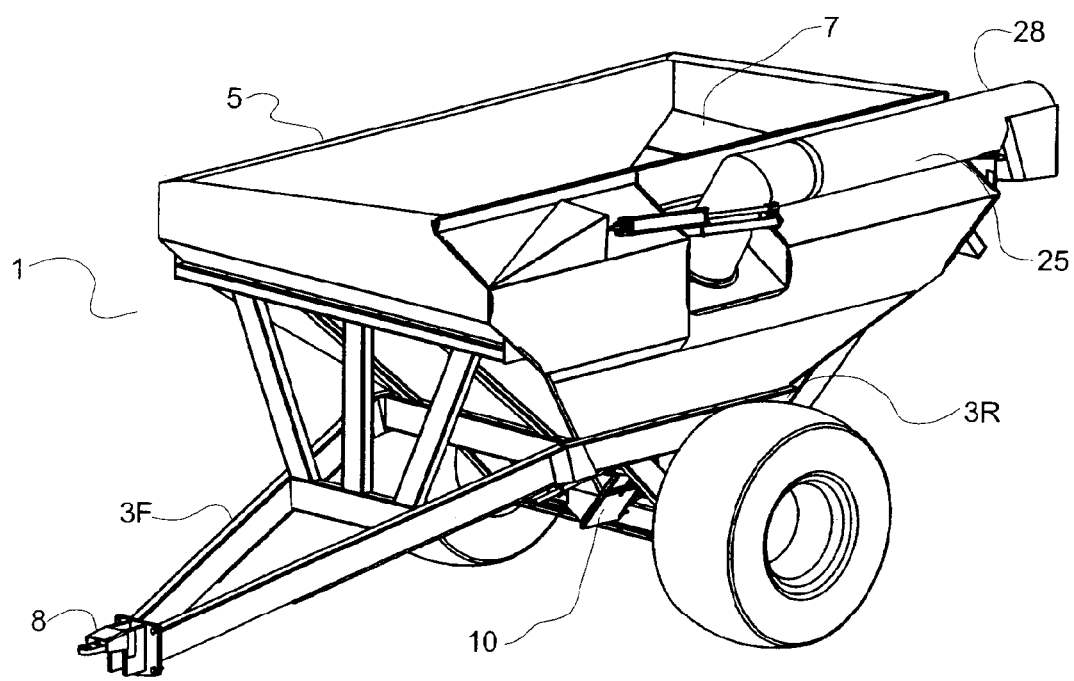
FIG. 1 is a perspective view of an embodiment of the present invention.
Figure 2:
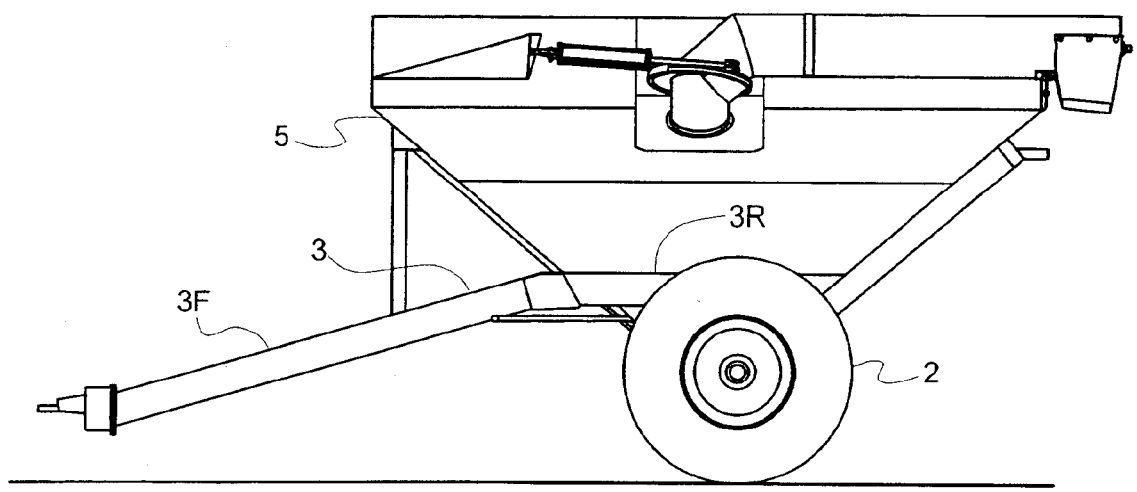
FIG. 2 is a side view of the embodiment of FIG. 1.
Figure 3:
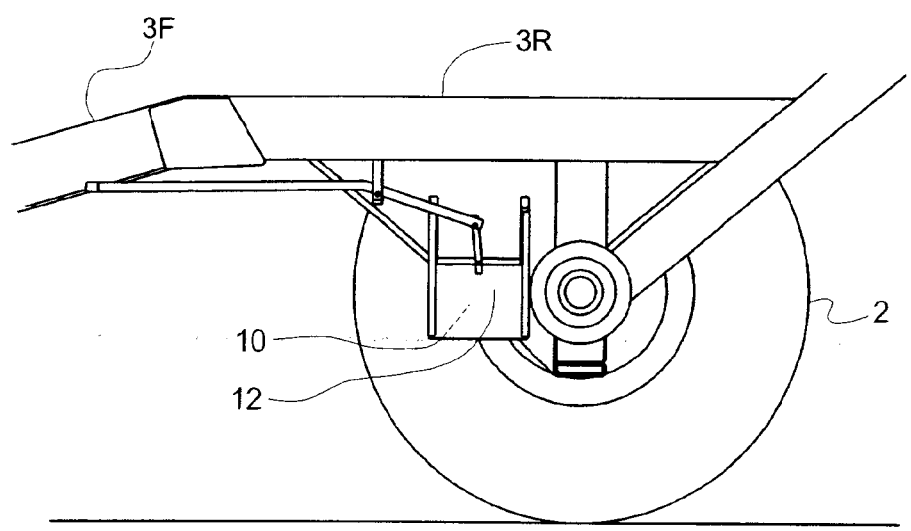
FIG. 3 is a side view of the port and gate with the left wheel of the apparatus removed.

FIGS. 1–3 illustrate a dual purpose two-wheeled cart 1 adapted for attachment to a rear end of a tow vehicle for movement along the ground on wheels 2. The cart 1 is adapted to receive granular crop production from a combine and transfer same to another transport vehicle, and adapted to transport granular agricultural products to an air-seeder cart. The cart 1 comprises a hoppered container 5 having a floor 7 sloping downward and inward from walls of the container to a central sump 9.

The frame 3 comprises a rear frame portion 3R is oriented substantially horizontally and supports the hoppered container 5. A front frame portion 3F slopes downward and forward from a front end of the rear frame portion 3R to a hitch 8 on a forward end thereof adapted for attachment to the rear end of a tow vehicle. The downward sloping front frame portion 3F provides a transition between the higher rear frame portion 3R and the lower position required to allow hitching to a tow vehicle, while still providing ample clearance under that part of the front frame portion 3F near the port 10.

A port 10 is located below the rear frame portion 3R and oriented to allow granular agricultural products such as seed, fertilizer, and the like, to flow out of the sump 9. A gate 12 is operable to open and close the port 10 and control the amount of agricultural products flowing out of the port 10. Wheels 2 are rotatably mounted about a common rotational axis to the frame 3 on axle member 14. The axle member 14 is attached to the frame 3 below the rear frame portion 3R and rearward of the port 10.

Figure 5:
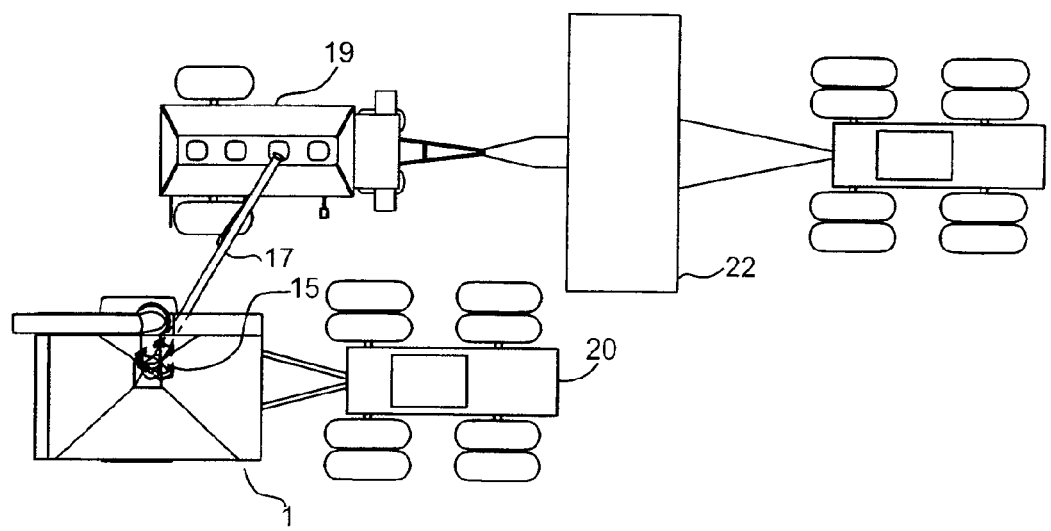
FIG. 5 is a top view as in FIG. 4 with the intake hopper of the filling conveyor in position under the port to receive a flow of agricultural material for transfer into the air-seeder.
Figure 6:
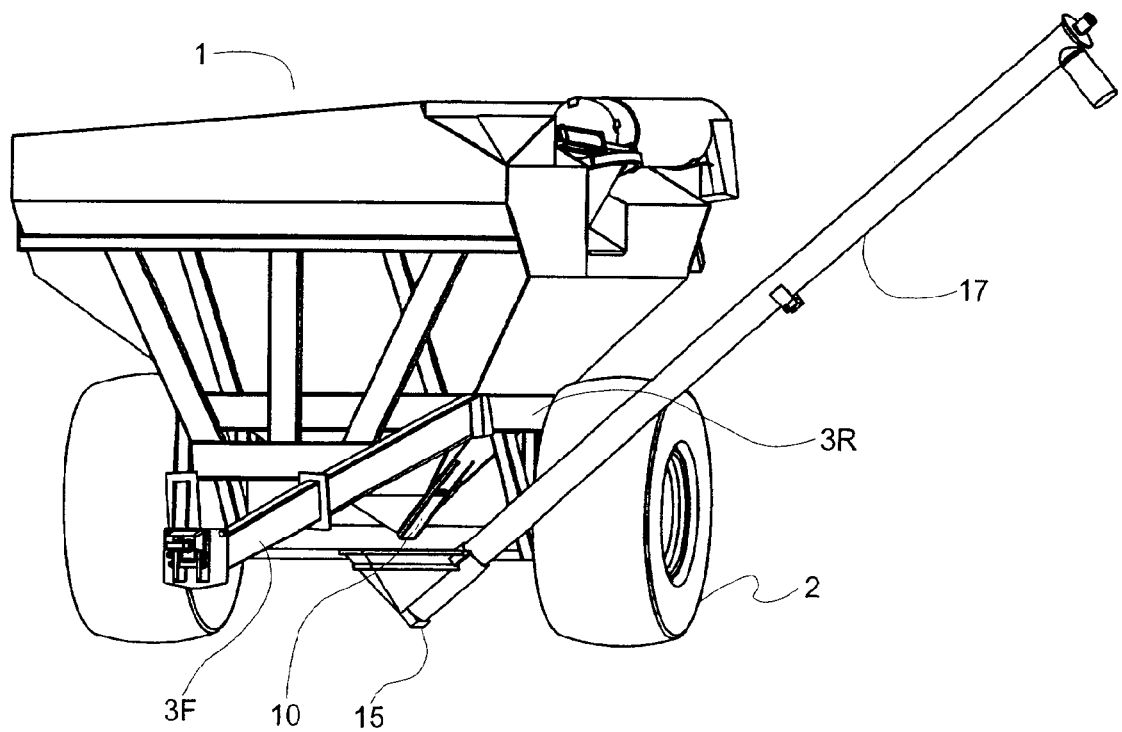
FIG. 6 is a perspective view of the intake hopper of the filling conveyor of an air-seeder cart in place under the port.

This configuration provides an access area below the port 10, ahead of the port 10, and towards the left side of the cart that is unobstructed, thereby allowing an intake hopper 15 of the filling conveyor 17 on an air-seeder cart 19 to be positioned under the port 10 ahead of the wheel 2 on the left side, as illustrated in FIGS. 5 and 6.

Figure 4:
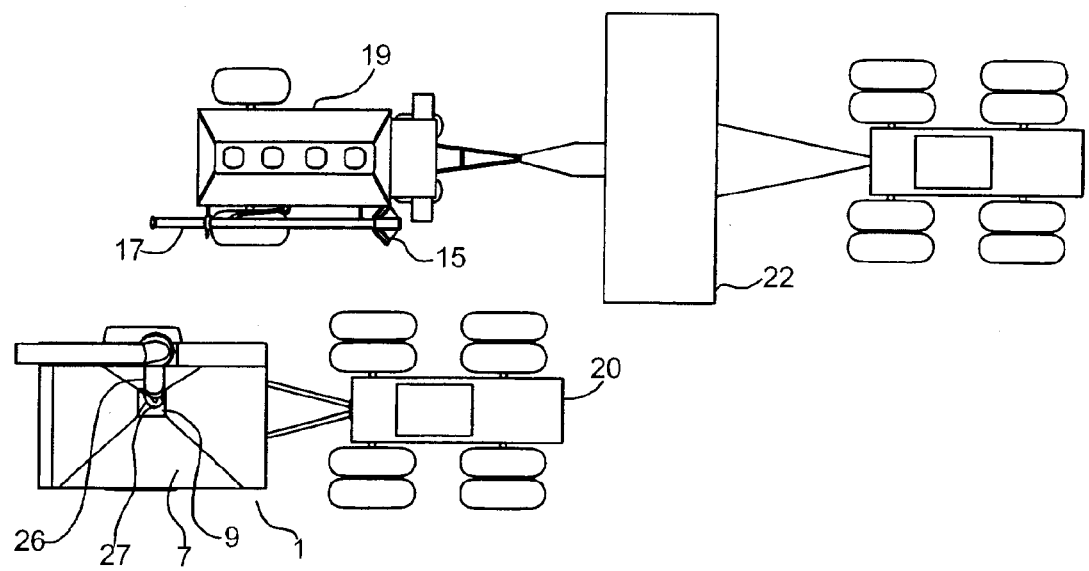
FIG. 4 is a top view of the embodiment of FIG. 1 in position alongside an air-seeder with the filling conveyor of the air-seeder in the transport position.

FIG. 4 shows the cart 1 attached to a tractor 20 that has towed the cart 1 into position alongside an air-seeder cart 19 behind the air-seeder toolbar 22. The conventional filling conveyor 17 is pivoted from the transport position of FIG. 4 into a loading position under the port 10 as illustrated in FIGS. 5 and 6 with the conventional filling conveyor 17 positioned in front of the left wheel of the cart 1 with the intake hopper 15 thereof under the port such that granular agricultural products flowing out of the port can be received by the intake hopper 15. In prior art carts it is not possible to move the intake hopper 15 under the port 10 because the area is obstructed by frame components. As illustrated in FIG. 6 the conventional filling conveyor 17 is oriented at a relatively steep angle requiring considerable clearance to allow for proper positioning.

Figure 7:
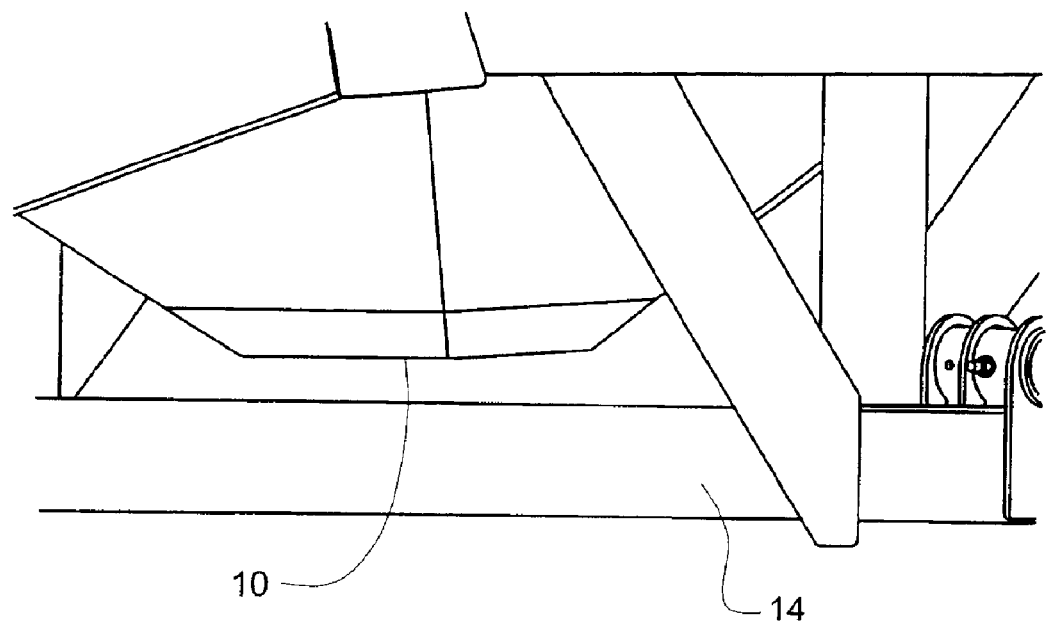
FIG. 7 is a perspective view of a cart wherein the port is oriented substantially horizontally.

In FIGS. 1, 3, 6, and 8 the port 10 is oriented upright facing the left side of the cart 1. Grain or the like will flow out of the sump 9 in that direction, further facilitating the placement of a receiving conveyor intake to receive the flow. Alternatively the port 10 could be oriented horizontally as illustrated in FIG. 7, however more clearance would then need to be provided, as the intake hopper 15 would need to be moved farther under the grain cart 1.

Figure 8:
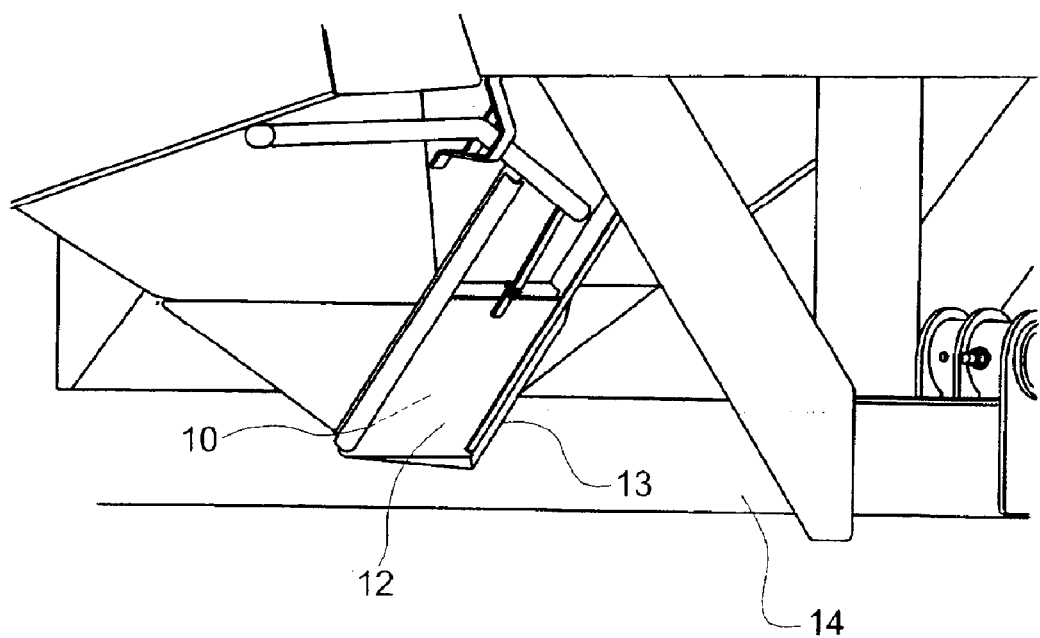
FIG. 8 is a perspective view of an alternate embodiment comprising a chute to direct the flow forward and outward to facilitate placement of an intake hopper to receive the flow.

The embodiment illustrated in FIG. 8 shows the addition of a chute 13 located under and on a rearward side of the port 10. The chute 13 directs the flow of grain or the like out of the port 10 forward and outward toward the left side of the cart 1, yet further facilitating placement of an intake to receive the flow.

The cart 1 also includes an unloading conveyor 25 operable to move agricultural products from the sump to a conveyor discharge located on an exterior of the container at a suitable location for discharging into a transport vehicle.

The unloading conveyor 25 of the illustrated embodiment comprises an auger 26 with an intake end 27 located in the sump 9, adjacent to the port 10. In the illustrated embodiment, the unloading conveyor 25 also has a pivoting lateral section 28. Other unloading conveyor configurations could be used as well.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A dual purpose two-wheeled cart adapted for attachment to a rear end of a tow vehicle for movement along the ground, the dual purpose cart adapted to receive granular crop production from a combine and transfer same to a transport vehicle, and adapted to transport granular agricultural products to an air-seeder cart, the dual purpose cart comprising:
   a hoppered container having a floor sloping downward and inward from walls of the container to a central sump;
   a frame comprising a rear frame portion supporting the hoppered container, and a front frame portion extending forward from the rear frame portion and having a front end forward of and below the rear frame portion;
   a hitch on the front end of the front frame portion adapted for attachment to the rear end of the tow vehicle;
   a port located below the rear frame portion and oriented substantially upright and generally facing a first side of the dual purpose cart to allow granular agricultural products to flow out of the sump onto the ground beneath the hoppered container and towards the first side of the dual purpose cart;
   a gate operable to open and close the port;
   a pair of wheels rotatably mounted on the frame on a common rotational axis, such that the rotational axis is located below the rear frame portion and rearward of the port;
   wherein an access area below the port, ahead of the port, and to the first side of the port, is unobstructed, such that a conventional filling conveyor mounted on the air-seeder cart can be positioned in front of a wheel on the first side of the dual purpose cart with an intake hopper thereof resting on the ground under the port such that granular agricultural products flowing out of the port can be received by the intake hopper prior to landing on the ground; and
   an unloading conveyor attached to the hoppered container such that the unloading conveyor is operable to move agricultural products from the sump to a conveyor discharge located on an exterior of the container at a location oriented the agricultural products into the transport vehicle.

2. The dual purpose cart of claim 1 further comprising a chute located under the port and operative to direct agricultural products exiting the port forward.

3. The dual purpose cart of claim 2 wherein the chute also directs the agricultural products toward the first side of the dual purpose cart.

4. The dual purpose cart of claim 1 wherein the unloading conveyor comprises an auger, and wherein an intake of the auger is located in the sump, adjacent to the port.

5. The dual purpose cart of claim 1 wherein the gate is operable to control the amount of agricultural products flowing out of the port.

6. The dual purpose cart of claim 1 wherein the front frame portion slopes downward and forward from the front end of the rear frame portion.

7. An agricultural seeding apparatus comprising:
   an air-seeder comprising an air-seeder cart and an air-seeder cart filling conveyor mounted on the air-seeder cart;
   a dual purpose cart adapted for attachment to a rear end of a tow vehicle for movement along the ground, the dual purpose cart adapted to receive granular crop production from a combine harvester and transfer same to a transport vehicle, and adapted to transport granular agricultural products to the air-seeder cart, the dual purpose cart comprising:
   a hoppered container having a floor sloping downward and inward from walls of the container to a central sump;
   a frame comprising a rear frame portion supporting the hoppered container, and a front frame portion extending forward from the rear frame portion and having a front end forward of and below the rear frame portion;
   a hitch on the front end of the front frame portion adapted for attachment to the rear end of the tow vehicle;
   an unloading conveyor attached to the hoppered container and operable to move agricultural products from the sump to a conveyor discharge located on an exterior of the container at a location oriented to discharge the agricultural products into the transport vehicle;
   a port located below the rear frame portion and oriented substantially upright and generally facing a first side of the dual purpose cart to allow granular agricultural products to flow out of the sump towards the ground and towards the first side of the dual purpose cart;
   a gate operable to open and close the port; and
   a pair of wheels rotatably mounted on the frame on a common rotational axis, such that the rotational axis is located below the rear frame portion and rearward of the port;
   wherein an access area below the port, ahead of the port, and to the first side of the port, is unobstructed;
   wherein the air-seeder cart filling conveyor is positioned in front of a wheel on the first side of the dual purpose cart with the intake hopper thereof on the ground under the port such that granular agricultural products flowing out of the port toward the ground are received by the intake hopper and transferred through the air-seeder cart filling conveyor into the air-seeder cart.

8. The apparatus of claim 7 further comprising a chute located under the port and operative to direct agricultural products exiting the port forward.

9. The apparatus of claim 8 wherein the chute also directs the agricultural products toward the first side of the dual purpose cart.

10. The apparatus of claim 7 wherein the unloading conveyor comprises an auger, and wherein an intake of the auger is located in the sump, adjacent to the port.

11. The apparatus of claim 7 wherein the gate is operable to control the amount of agricultural products flowing out of the port.

12. The apparatus of claim 7 wherein the front frame portion slopes downward and forward from the front end of the rear frame portion.

13. An agricultural seeding apparatus comprising:
- an air-seeder comprising an air-seeder cart and an air-seeder cart filling conveyor mounted on the air-seeder cart;
- a dual purpose cart adapted for attachment to a rear end of a tow vehicle for movement along the ground, the dual purpose cart adapted to receive granular crop production from a combine harvester and transfer same to a transport vehicle, and adapted to transport granular agricultural products to the air-seeder cart, the dual purpose cart comprising:
  - a hoppered container having a floor sloping downward and inward from walls of the container to a central sump;
  - a frame and a hitch on the front end of the frame adapted for attachment to the rear end of the tow vehicle;
  - an unloading conveyor attached to the hoppered container and operable to move agricultural products from the sump to a conveyor discharge located on an exterior of the container at a location oriented to discharge the agricultural products into the transport vehicle;
  - a port located below the frame and oriented to allow granular agricultural products to flow out of the sump towards the ground;
  - a gate operable to open and close the port; and
  - a pair of wheels rotatably mounted on the frame on a common rotational axis, such that the rotational axis is located below the frame and rearward of the port;

wherein an access area below the port and ahead of the port is unobstructed;

wherein the air-seeder cart filling conveyor is positioned in front of a wheel on the first side of the dual purpose cart with the intake hopper thereof on the ground under the port such that granular agricultural products flowing out of the port toward the ground are received by the intake hopper and transferred through the air-seeder cart filling conveyor into the air-seeder cart.

* * * * *

UNITED STATES PATENT AND TRADEMARK OFFICE
CERTIFICATE OF CORRECTION

PATENT NO. : 6,893,202 B2 Page 1 of 1
DATED : May 17, 2005
INVENTOR(S) : Jeff Hunt It is certified that error appears in the above-identified patent and that said Letters Patent is hereby corrected as shown below:

<u>Column 5,</u>
Line 57, after "oriented" and before "the" insert -- to discharge --.

Signed and Sealed this

Second Day of May, 2006

JON W. DUDAS
*Director of the United States Patent and Trademark Office*